May 1, 1962     J. ZIFFER ET AL     3,032,470
POLYAMINOHYGROSTREPTIN AND PRODUCTION THEREOF Filed Feb. 5, 1960     3 Sheets-Sheet 2

FIG. 2

INVENTORS:
JACK ZIFFER
ALFRED W. CHOW
THOMAS J. CAIRNEY
SACHIKO ISHIHARA
BENNETT

BY Margall, Johnston, Cook & Root

ATT'YS

May 1, 1962  J. ZIFFER ET AL  3,032,470
POLYAMINOHYGROSTREPTIN AND PRODUCTION THEREOF
Filed Feb. 5, 1960  3 Sheets-Sheet 3

FIG. 3
INFRARED ABSORPTION SPECTRUM OF PHYTOSTREPTIN (K Br Pellet)

INVENTORS:
JACK ZIFFER
ALFRED W. CHOW
THOMAS J. CAIRNEY
SACHIKO ISHIHARA
BENNETT
BY
ATT'YS

United States Patent Office 3,032,470
Patented May 1, 1962

3,032,470
POLYAMINOHYGROSTREPTIN AND PRODUCTION THEREOF
Jack Ziffer, Milwaukee, Wis., Alfred W. Chow, Philadelphia, Pa., and Thomas J. Cairney and Sachiko Ishihara Bennett, Milwaukee, Wis., assignors to Pabst Brewing Company, Chicago, Ill., a corporation of Delaware
Filed Feb. 5, 1960, Ser. No. 6,979
17 Claims. (Cl. 167—65)

This invention relates to an antifungal and to a process for producing it.

The invention is concerned more particularly with a new antifungal identified by the arbitrary name Phytostreptin, now known under the non-proprietary name "polyaminohygrostreptin," to its production by fermentation, to methods for its recovery from fermentation broths, to the process for its purification and to methods for the preparation of its active salts and complexes. The invention includes within its scope the antifungal in dilute forms, as crude concentrates and purified preparations.

Phytostreptin is especially effective against many fungi pathogenic to plants and the principal object of the present invention is to provide a new and useful antifungal for the control of diseases caused by these phytopathogenic fungi.

The new antifungal is formed during cultivation under controlled conditions of a member of the family Streptomycetaceae, specifically, a strain of the species *Streptomyces hygroscopicus*. A culture of a strain of the microorganism which produces phytostreptin has been deposited in the culture collection of the United States Department of Agriculture, Agricultural Research Service, Northern Utilization Research and Development Division, Peoria, Illinois, and the culture has been assigned the number NRRL 2751 in the culture collection. Accordingly, the strain producing phytostreptin is referred to herein as *Streptomyces hygroscopicus* NRRL 2751, or for brevity, NRRL 2751.

Strain NRRL 2751 has been comparatively tested for the production of phytostreptin with other reported strains of *S. hygroscopicus* and with microorganisms which were originally identified in some other manner but appeared to be correctly identified as strains of *S. hygroscopicus*. The tests demonstrated that none of the other strains produces phytostreptin.

Microorganism strains which were tested and found not to produce phytostreptin include: *S. hygroscopicus* var. *angustmyceticus* (Yuntsen et al., J. Antibiotics (Japan), 7A, 113, 116 (1954); 9A, 195 (1956); 11A, 233, 244 (1958); reported to produce angustmycins A, B, C); *S. hygroscopicus* NRRL B-1346 (ATCC 10976); *S. hygroscopicus* NRRL B-1503 (Nakazawa et al., J. Agr. Chem. Soc. Japan, 28, 296, 715 (1954), C.A. 50, 5839 (1956); Japanese Patent No. 8046 (1954), C.A. 50, 8146 (1956); reported to produce hygroscopins); *S. rutgersensis* var. *castelarense* NRRL B-1567 (Cercos, Rev. Argentina Agron., 20, 53 (1953), C.A. 48, 2819 (1954); Waksman et al., Actinomycetes and Their Antibiotics (1953), 197; reported to produce camphomycin); *S. endus* NRRL 2339 (Gottlieb, Phytopath., 41, 393 (1951); U.S. Patent No. 2,746,902; reported to produce endomycin); and *S. platensis* NRRL 2364 (reported to produce oxytetracycline).

It originally appeared on the basis of the classification system in Waksman and Lechevalier, Actinomycetes and Their Antibiotics (Williams and Wilkens Co., 1953, pages 9–20), that strain NRRL 2751 belonged to the *Streptomyces albus* group of microorganisms, although from its growth and biochemical characteristics it did not appear to be identical with any of the described species. Also, the properties of the antibiotics reportedly produced by these and other cultures are distinct from those of the new antifungal of the present invention, phytostreptin. Subsequently, investigations were undertaken based on the classification system published in Applied Microbiology, 6, 52–79 (1958) by Pridham, and direct morphological comparison with known strains of *S. hygroscopicus*, paying particular attention to the three common characteristics reported for *S. hygroscopicus* (Tresner et al., Applied Microbiology, 4, 243–250 (1956)): (*a*) compact spiral spore-bearing hyphae, (*b*) grey-colored aerial mycelium on certain media, and (*c*) dark areas on certain media which may be hygroscopic. These investigations established that strain NRRL 2751 is a strain of *S. hygroscopicus*.

In view of the original classification as apparently a member of the *S. albus* group, strain NRRL 2751 also has been comparatively tested for the production of phytostreptin with the available species of the *S. albus* group which appear to be the most closely related thereto, namely, *S. californicus* ATCC 3312 and *S. gelaticus* ATCC 3323. The tests demonstrated that neither of the latter strains produces phytostreptin.

The characteristics of the strain NRRL 2751 closely resemble those described in our copending application Serial No. 628,769, filed December 17, 1956, and our continuation application thereof, Serial No. 7,064 filed February 5, 1960 for the phytoactin-producing strain of *S. hygroscopicus*, NRRL 2752. There are, however, certain morphological and biochemical characteristics that distinguish the two strains, as described hereinafter.

The organism NRRL 2751 produces spiral sporophores and the slightly oval to spherical spores measure 1–1.3 microns in diameter. The following growth characteristics are observed after incubation (28° C.) on various media for 14 days.

Nutrient agar: abundant growth; colorless to white aerial mycelium; colorless reverse; faint brown soluble pigment.

Glucose asparagine agar: abundant growth; grey aerial mycelium; colorless reverse; light brown soluble pigment.

Starch agar: abundant growth; grey aerial mycelium; exudate appearing during first week, disappearing during second week; very faint brown soluble pigment.

Nutrient broth: colorless to white surface growth; submerged growth on bottom; no pigment.

Dextrose nitrate broth: colorless growth on surface; growth on bottom; light brown pigment; strong nitrate reduction.

Litmus milk: tannish to white ring of growth; complete peptonization in one week, no coagulation.

Gelatin: colorless ring of growth; submerged growth on bottom; gelatin liquified after 24 days.

Potato: poor growth; colorless vegetative growth on surface except for white to grey aerial mycelium on drying tip; light brown diffused pigment throughout plug.

Oatmeal agar: abundant growth; grey aerial mycelium; light brown soluble pigment.

Yeast extract-oatmeal agar: abundant growth; grey aerial mycelium; light brown soluble pigment.

Potato dextrose agar: abundant growth; grey aerial mycelium; moderate brown soluble pigment.

Wickerham's agar: abundant growth; white aerial mycelium; light yellowish reverse; faint brown soluble pigment.

Sabouraud's agar: moderate growth; light grey mycelium; moderate brown soluble pigment.

Czapek agar: abundant growth; smooth, light tan vegetative mycelium (no aerial mycelium); faint brown soluble pigment.

Calcium malate agar: poor growth; colorless vegetative mycelium.

Temperature: excellent growth 28°–34° C. Poor growth on agar but good growth on potato plug at 41° C. No growth at 50° C.

The growth characteristics of the organism NRRL 2751 were also observed following incubation on the diagnostic media described below for 23 days at 28° C., and any modifications in growth characteristics which occurred after 23 days and up to 44 days at 28° C., were noted. The media were as follows:

Asparagine-glucose-meat extract agar: Percent
- Glucose _________________________________ 1
- Asparagine ______________________________ 0.05
- $K_2HPO_4$ _____________________________ 0.05
- Beef extract ____________________________ 0.2
- Agar ____________________________________ 1.5
- Tap water
- pH adjusted to 7 before sterilization.

Corn steep liquor agar (Waksman): Percent
- Glucose _________________________________ 1
- Peptone _________________________________ 0.5
- Corn steep liquor _______________________ 1.5
- NaCl ____________________________________ 0.5
- Agar ____________________________________ 1.5
- Distilled water
- ph adjusted to 7.2 before sterilization.

Gelatin (Waksman): Percent
- Glucose _________________________________ 2
- Peptone _________________________________ 0.5
- Gelatin _________________________________ 15.0
- Tap water
- pH adjusted to 7 before sterilization.

Nitrate broth (Difco): Percent
- Beef extract ____________________________ 0.3
- Peptone _________________________________ 0.5
- $KNO_3$ _________________________________ 0.1
- Distilled water Bennett's agar: Percent
- Glucose _________________________________ 1
- Beef extract ____________________________ 0.4
- N-Z-amine A _____________________________ 0.4
- Yeast extract ___________________________ 0.1
- NaCl ____________________________________ 0.25
- Agar ____________________________________ 1.5
- Distilled water Czapek agar (Difco): Percent
- Sucrose _________________________________ 3
- $NaNO_3$ ________________________________ 0.2
- $K_2HPO_4$ _____________________________ 0.1
- $MgSO_4 \cdot 7H_2O$ ___________________ 0.05
- KCl _____________________________________ 0.05
- $FeSO_4 \cdot 7H_2O$ ___________________ 0.001
- Agar ____________________________________ 1.5
- Distilled water Litmus milk: Percent
- Glucose _________________________________ 1
- Dried skim milk _________________________ 9.0
- Yeast extract ___________________________ 0.2
- Protease peptone ________________________ 0.2
- Distilled water
- 1% litmus solution to color Oatmeal-yeast extract agar: Percent
- Glucose _________________________________ 0.5
- Yeast extract ___________________________ 0.1
- Oatmeal extract _________________________ 5.0
- Agar ____________________________________ 1.5
- Tap water Potato dextrose agar: Percent
- Glucose _________________________________ 2
- Potato extract __________________________ 20
- Agar ____________________________________ 2
- Tap water Starch agar (Difco): Percent
- Beef extract ____________________________ 0.3
- Soluble starch __________________________ 1
- Agar ____________________________________ 1.2
- Distilled water Potato plug:
- Raw potato plug moistened with distilled water.

Yeast extract agar (Waksman): Percent
- Glucose _________________________________ 1
- Yeast extract ___________________________ 1
- Agar ____________________________________ 1.5
- Tap water
- pH adjusted to 6.8 before sterilization The following growth characteristics were observed, the aerial mycelium colors being described according to Ridgeway, Color Standards and Color Nomenclature (Washington, D.C., 1912):

Asparagine-glucose-meat extract agar:
Excellent growth with neutral grey aerial mycelium. Light yellow brown reverse and light brown souble pigment.

Bennett's agar:
Excellent growth with colorless dry vegetative mycelium. Light yellow-brown reverse and light brown soluble pigment.

Corn steep liquor agar:
Excellent growth with colorless, dry (moist after 7 days), wrinkled vegetative mycelium. Sparse white aerial mycelium forming after 30 days. Light yellow-brown reverse with fairly strong brown soluble pigment.

Czapek agar:
Excellent growth with palid to pale neutral grey aerial mycelium. Black areas forming after 30 days, not becoming moist after 44 days. Light yellow reverse and light brown soluble pigment.

Gelatin:
Liquefied after 9 days

Litmus milk:
Colorless to white ring of growth with no coagulation. No peptonization after 7 days, 100% after 14 days. Milk pH 6.6 after 23 days.

Nitrate broth:
Reduced.

Oatmeal-yeast extract agar:
Excellent growth with neutral grey aerial mycelium. Black areas forming after 30 days, not becoming moist after 44 days.

Potato dextrose agar:
Excellent growth with light neutral to neutral grey aerial mycelium. Yellow brown reverse and light brown soluble pigment.

Potato plug:
Poor growth with colorless vegetative mycelium. White to light grey on drying tip. Black areas forming in butt after 44 days.

Starch agar:
Excellent growth with mouse grey aerial mycelium. Light yellow brown reverse and faint brown soluble pigment.

Yeast extract agar:
Excellent growth with pale smoke grey aerial mycelium. Dark grey areas forming after 30 days, not becoming moist after 44 days. Light yellow-brown reverse and light brown soluble pigment.

The above results included the dark areas characteristic of *S. hygroscopicus*, which were exhibited on Czapek agar, oatmeal-yeast extract agar, potato plug, and yeast extract agar. In addition, the organism showed moist black areas on year-old refrigerated starch agar slants. The organism also produced the characteristic grey-colored aerial mycelium on a number of the media, and the characteristic compact spore-bearing hyphae were produced on agar media such as asparagine-glucose-meat extract agar, potato dextrose agar, and oatmeal-yeast extract agar.

The growth characteristics of the phytostreptin-producing organism NRRL 2751 closely resemble those for the phytoactin-producing organism NRRL 2752, described in the aforementioned copending applications. The two cultures were closely examined over a 41 day incubation period (28° C.) on various media. Identical growth characteristics were obtained on oatmeal agar, potato dextrose agar, calcium malate agar, potato plug, dextrose nitrate broth and gelatin. On the other media, NRRL 2752, in general, formed darker aerial mycelium than did NRRL 2751. In addition, there was a marked difference in the rate of peptonization of milk by the two cultures. A comparison of the two cultures is given in Table I.

TABLE I

| Media | NRRL 2751 | NRRL 2752 |
|---|---|---|
| Asparagine glucose agar. | Excellent growth; dark grey aerial mycelium with a few light grey spots. | Excellent growth; light and dark grey aerial mycelium with a few black areas. |
| Starch agar | Excellent growth; dark grey aerial mycelium. | Excellent growth; dark grey to black aerial mycelium with small white areas. |
| Nutrient broth | Almost all growth fallen to bottom after 24 days. | Complete formed pellicle; white to very light grey aerial mycelium. |
| Litmus milk | Rapid peptonization, complete in 1 to 2 weeks. | Very slow peptonization, complete after 6 weeks. |
| Oatmeal-yeast extract agar. | Excellent growth; medium grey aerial mycelium. | Excellent growth; medium grey to black aerial celium. |
| Wickerham agar. | Excellent growth; white aerial mycelium; few black spots on agar butt area. | Excellent growth; white to light grey to black aerial mycelium; black growth covers ⅓ of agar butt area. |
| Nutrient agar | Good growth; colorless to white smooth growth covering entire agar area. | Good growth; small amount of white to grey aerial mycelium in agar butt area; remainder of growth (beaded) colorless. |

Phytostreptin is particularly effective against fungi. It also has antibacterial properties. Its in vitro spectrum against a number of fungi and bacteria is shown in Table II. In addition, in a paper disc-agar plate assay test using potato dextrose agar, phytostreptin developed zones of inhibition against *Ceratostomella ulmi* (*Ceratocystis ulmi*), the causative agent of Dutch elm disease, at about 40 micrograms per milliliter.

The tests reported in Table II were made in agar slant tubes using agar media containing various concentrations of phytostreptin in the range of 0.01 to 197 micrograms per ml. Potato dextrose agar was used for all the fungal cultures except *Candida albicans* and the dermatophytes *Epidermophyton floccosum*, *Microsporum gypseum* and *Trichophyton mentagrophytes*. Sabouraud maltose agar was used for the three dermatophytes. Penassay seed agar was used for *C. albicans* and the bacterial cultures. The agar media were inoculated with the respective test organism and incubated at 28° C., until the control tube, containing no antifungal, showed good growth (approximately 2–4 days for the fungal cultures and 1 day for *C. albicans* and the bacterial cultures). The inhibiting concentration of phytostreptin for each of these organisms was then noted. The incubation period was then continued for four days and two additional inhibition readings made; at two days and four days, respectively (after the initial reading). One culture, *Endoconidiophora fagacearum* (*Ceratocystis fagacearum*), the causative agent of oak wilt, was incubated for an additional four week period with no change in the inhibitory level of phytostreptin (0.3 microgram (μg.) per milliliter). Attempts to isolate *E. fagacearum* (*C. fagacearum*) from the inhibited levels were unsuccessful. Accordingly, as indicated by the in vitro data, phytostreptin, in general, is an effective antifungal and gram-positive antibacterial substance.

TABLE II—IN VITRO ANTIMICROBIAL SPECTRUM

| Culture | Culture inhibited at indicated concentration (μg./ml.) | | |
|---|---|---|---|
| | After initial growth [1] | 2 days later | 4 days later |
| *Alternaria dianthi* | 2.4 | 2.4 | 2.4 |
| *Alternaria solani* | 0.8 | 0.8 | 0.8 |
| *Botrytis gladiolorum* | 0.8 | 0.8 | 2.4 |
| *Botrytis cinerea* | 2.4 | 2.4 | 2.4 |
| *Colletotrichum circinans* | 0.8 | 2.4 | 2.4 |
| *Diplodia zeae* | 2.4 | 2.4 | 2.4 |
| *Endoconidiophora fagacearum* (*Ceratocystis fagacearum*) | 0.3 | 0.3 | 0.3 |
| *Endoconidiophora fimbriata* (*Ceratocystis fimbriata*) | 0.8 | 0.8 | 0.8 |
| *Endothia parasitica* | 0.8 | 2.4 | 2.4 |
| *Fusarium oxy. f. dianthi* 5A | 7.3 | [2] 7.3–197 | [2] 7.3–197 |
| *Fusarium oxy. f. gladioli* | 2.4 | [2] 2.4–197 | [2] 2.4–197 |
| *Fusarium roseum* | 2.4 | 7.3 | 22 |
| *Gibberella zeae* | 7.3 | [2] 7.3–197 | [2] 22–197 |
| *Glomerella cingulata* | 0.3 | 0.8 | 2.4 |
| *Helminthosporium sativum* | 0.8 | 2.4 | 2.4 |
| *Helminthosporium victoria* | 0.8 | 0.8 | 0.8 |
| *Macrophominia phaseoli* | 2.4 | 2.4 | 2.4 |
| *Phytophthora cinnamomi* | 7.3 | [2] 7.3–197 | [2] 7.3–197 |
| *Pythium sp.* No. 389 | 7.3 | 22 | 22 |
| *Sclerotina fructicola* | 0.8 | 0.8 | 2.4 |
| *Rhizoctonia solani* | 2.4 | 2.4 | [2] 2.4–197 |
| *Verticillium albo-atrum* | 0.8 | 2.4 | 2.4 |
| *Candida albicans* | 2.4 | 2.4 | 2.4 |
| *Epidermophyton floccosum* | 0.8 | 0.8 | 2.4 |
| *Microsporum gypseum* | 2.4 | 2.4 | 2.4 |
| *Trichophyton mentagrophytes* | 0.8 | 2.4 | 2.4 |
| *Bacillus cereus* | 7.3 | 22 | 22 |
| *Bacillus cereus* var. *mycoides* | 7.3 | 22 | 22 |
| *Bacillus megatherium* | 7.3 | 7.3 | 7.3 |
| *Bacillus subtilis* | 7.3 | 22 | 22 |
| *Escherichia coli* | [3] >197 | >197 | >197 |
| *Micrococcus flavus* | 0.3 | 2.4 | 2.4 |
| *Micrococcus pyogenes* var. *aureus* | 2.4 | 7.3 | 7.3 |
| *Mycobacterium tuberculosis* No. 607 | [3] >197 | >197 | >197 |
| *Sarcina lutea* | 2.4 | 2.4 | 2.4 |

[1] Inhibition readings made when control tube showed good growth—usually 1–4 days.
[2] Partial inhibition of culture.
[3] No inhibition at this level.

Phytostreptin has been shown in greenhouse studies to be an effective fungicide for the control of plant diseases such as tomato early blight, tomato late blight, and bean rust. These diseases are caused respectively by *Alternaria solani* (Ell. & Mort.) Jones & Grout, *Phytophthora infestans* (Mont.) de Bary, and *Uromyces phaseoli* (Pers.) Wint. Bonny best tomato plants and Pinto bean plants were used for the respective tests.

Phytostreptin was prepared for the spraying operation by dissolving it in methanol and diluting with water to give a clear solution. The final alcohol concentration was less than 6%. Alternatively, the antifungal may be dissolved in water alone. The potted plants were sprayed on a turntable by means of a spray gun, under standard conditions, with various dilutions. After the plants had dried, they were inoculated with spores of the above organisms produced under standard conditions. The inoculated plants were then placed in humidity chambers for 24 hours and then returned to the greenhouse. After several days, necrotic spots appeared on the leaves, and these were counted and expressed as a percentage of the control plants. The resulting dosage-response curves were plotted on logarithmic probability paper, and the concentration of antifungal necessary to give 95% control ($ED_{95}$) of the respective disease determined, in parts per million. The data for a series of replicated greenhouse tests with different preparations of phytostreptin are given in Table III. As indicated by these data, phytostreptin gives effective disease control at low concentration levels and is relatively non-phytotoxic.

TABLE III.—GREENHOUSE DISEASE CONTROL STUDIES

| | ED$_{95}$ (p.p.m.) | |
|---|---|---|
| Tomato early blight | Tomato late blight | Bean rust |
| 37, 100 | 100, 43 | 11, 14 |
| 37, 51 | 170, 35 | 17, 20 |
| 60, 60 | 70, 93 | 18, 6.2 |
| 110, <20 | 54, 76 | 8.5, 6.2 |
| 49, <20 | 48, 64 | 8.9, 6 |
| 68, 60 | 160, 120 | 16 |
| 33, 120 | 140, 92 | 19 |

| Concentration, p.p.m. | Phytotoxicity | |
|---|---|---|
| | Bonny best tomatoes | Pinto beans |
| 0.2 | ---------- | None |
| 2 | ---------- | None |
| 20 | None | None |
| 64 | None | ---------- |
| 200 | None | ---------- |

Phytostreptin is a polypeptide having an apparent free amino group as indicated below by its chemical and physical properties. It is a very light tan solid and is soluble in water, 1 N sodium hydroxide (forms gel on standing), methanol, ethanol, n-butanol, chloroform, acetone, methylisobutyl ketone, dioxane, tetrahydrofuran, formamide, and ethylene chloride. It is slightly soluble in diethyl ether and 1 N HCl, and insoluble in petroleum ether (30°–60° C.), benzene, and ethyl acetate.

Phytostreptin gives positive permanganate and biuret tests and negative anthrone, ferric chloride, Molisch, ninhydrin, Millon, Liebermann Buchard, maltol, Pauly, Ehrlich (dimethylaminobenzaldehyde), Sakaguchi and Fehling tests. It gives no color with cold concentrated sulfuric acid. It is precipitated from aqueous solution by ammonium sulfate, calcium chloride, barium chloride, cupric chloride, sodium chloride, zinc chloride, picric acid, phosphotungstic acid, trichloroacetic acid, methyl orange and Reinecke salt.

The polypeptide nature of this antibiotic was revealed by hydrolysis with 6 N HCl. The hydrolysate, now ninhydrin positive, was analyzed using two dimensional paper chromatographic techniques. The presence of at least eight ninhydrin-positive components was detected, of which the amino acids valine, alpha-alanine, proline, leucine (or isoleucine), arginine, glycine and serine were identified.

Phytostreptin is heat stable; no loss of activity occurred when a methanol solution was refluxed (65° C.) for 6 hours or when 30% aqueous methanol solutions, adjusted to pH 3, 7 and 10, were heated at 85° C. for 30 minutes. It is dialyzable through a cellophane membrane (aqueous solution). It is not digested by pepsin, trypsin, Pabst purified *Bacillus subtilis* bacterial protease or Pabst purified *Aspergillus oryzae* fungal protease.

Figure 1:
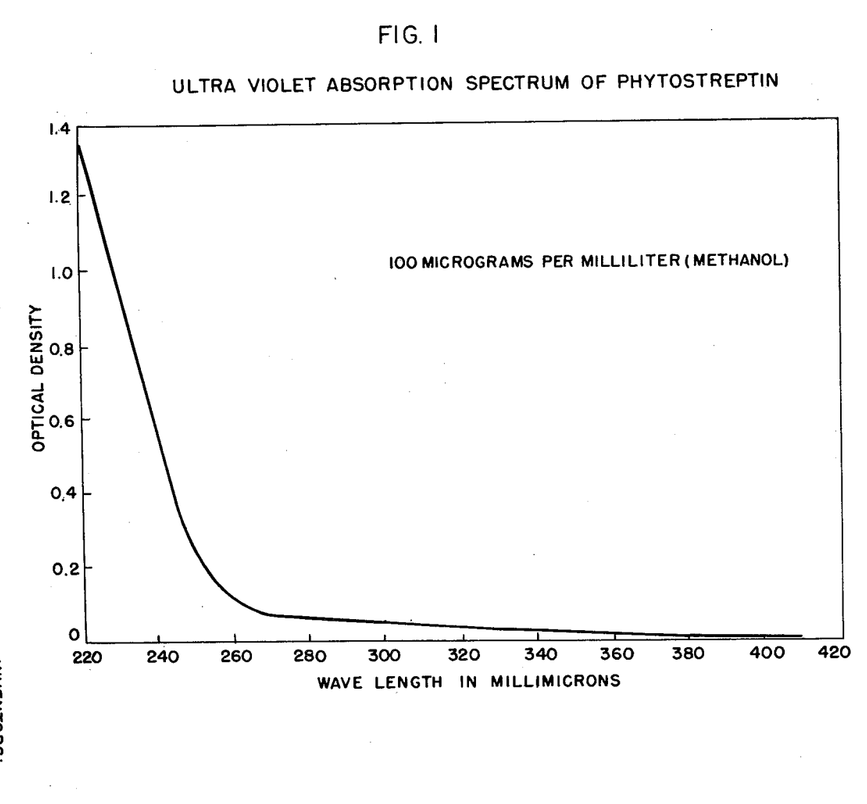

Phytostreptin exhibits strong end absorption in the lower regions of the ultraviolet with no significant maxima in the region 230–410 m$\mu$. Determinations were made in methanol (100 $\mu$g./ml.) with a Beckman DU Spectrophotometer, and the ultraviolet absorption spectrum is shown in FIGURE 1 of the accompanying drawings.

Figure 2:
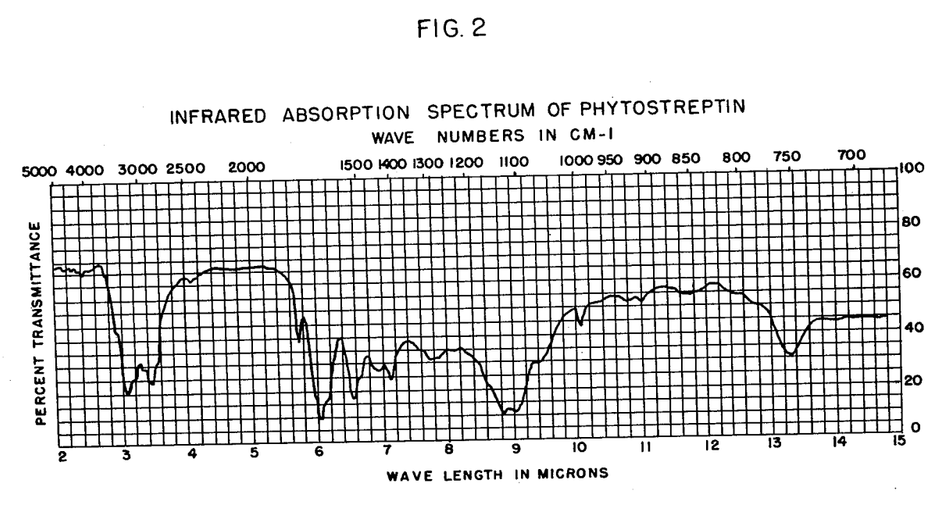

Phytostreptin shows a number of characteristic absorption bands in the infrared region when dissolved in chloroform, the more significant of which are at the following frequencies (expressed in microns): 2.93, 3.08, 3.20, 3.33, 3.45, 3.52, 4.12, 5.71, 5.74, 6.05, 6.15, 6.56, 6.70, 6.95, 7.12, 7.60, 7.76, 7.86, 8.12, 8.86, 9.05, 9.42, 10.06, 10.34, 10.80, 11.00, 11.46, 11.70 and 13.30. The spectrum was obtained on a Perkin-Elmer Model 21, double-beam infrared spectrophotometer, Serial No. 760 (gain 5.0, response 1.0, speed 6.0 and suppression 3.0). The infrared absorption spectrum of phytostreptin in chloroform is shown in FIGURE 2 of the accompanying drawings.

Figure 3:
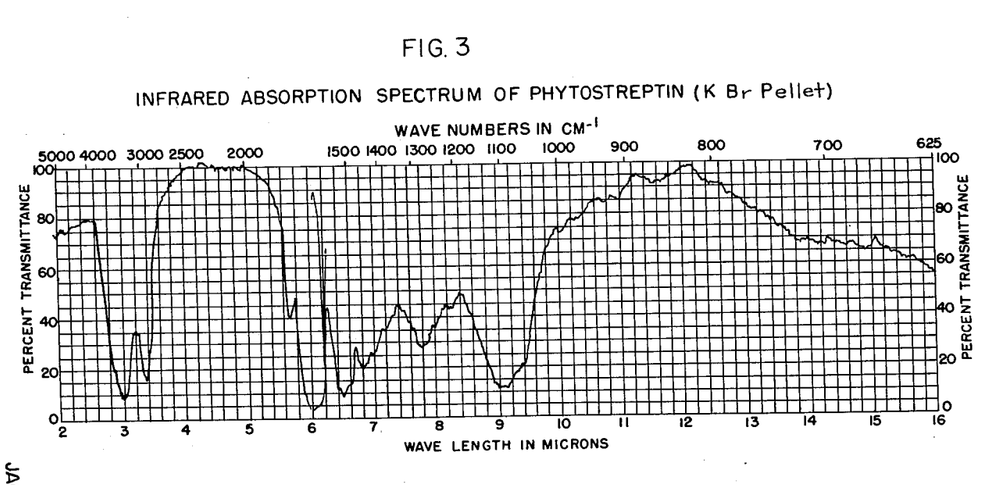

In order to eliminate the absorption of the chloroform solvent, the infrared absorption spectrum of phytostreptin was also obtained in a potassium bromide pellet with a 6.24 micron polystyrene reference band added, on a Baird Model 455 I.R. Spectrophotometer. This spectrum is shown in FIGURE 3 of the accompanying drawings. There is relatively little change from the determination in chloroform solution.

Referring to FIGURE 3, phytostreptin shows strong absorption bands at the following positions characteristic of the peptide bond, expressed in microns and parenthetically in wave numbers in reciprocal centimeters: 2.77–3.07 (3600–3250), 3.33–3.42 (3000–2925), 5.87–6.24 (1700–1600), and 6.42–6.70 (1560–1490). Other significant absorption bands are shown at: 6.0–6.07 (1670–1640), 6.83–6.90 (1470–1450), 7.20–7.35 (1390–1360) (shoulder), 7.57–7.93 (1320–1260), and 8.77–9.43 (1140–1060).

Phytostreptin is optically active; laevo rotatory $$[\alpha]_D^{28} - 81°$$

(C=1, methanol). The following electrometric titration data were obtained (titration started from acid range):

| Solvent | pK | Equivalent weight, grams/mole | Remarks |
|---|---|---|---|
| Water | 2.4 | 1,000 | Apparent free carboxyl group. |
| | 9.6 | 3,500 | Apparent free amino group. |
| 70+ methanol | 3.4 | 3,300 | Apparent free carboxyl group. |
| | 9.4 | 3,300 | Apparent free amino group. |

Phytostreptin exhibits an indefinite melting point, commencing at about 165° C. and melting with apparent decomposition. Melting ranges were determined in a sealed capillary in an oil bath, as follows: 168–178° C., 166–172° C., and 166–173° C.

Elemental analysis of phytostreptin gave the following values:

| C | H | N |
|---|---|---|
| 52.56 | 7.93 | 13.53 |
| 52.44 | 7.66 | 13.26 |
| 53.70 | 8.44 | 13.38 |
| 53.45 | 8.29 | 13.48 |
| [1] 53.04 | [1] 8.08 | [1] 13.41 |

[1] Average.

Amide nitrogen was found to be 1.5%. Sulfur and halogen are absent.

The molecular weight of phytostreptin has been determined to be 28,600 (plus or minus 10%) by the Ehrenberg modification of the Archibald method for the approach to sedimentation equilibrium. Two ultracentrifuge determinations were made in pH 7.2, 0.01 molar "tris" buffer with 0.05 molar NaCl added as a supporting electrolyte. Phytostreptin obtained as described herein satisfied the first criterion for ultracentrifugal homogeneity in "velocity ultracentrifuge" experiments. The material gave only one sedimenting boundary, which remained symmetrical throughout the experiments.

Phytostreptin was examined by ascending one-dimensional paper chromatography using Whatman No. 1 paper and the solvent systems indicated below. The developed chromatograms were air dried at room temperature and bioautographed on agar plates seeded with *Glomerella cingulata*.

| System | Rf | Remarks | Running time, hours |
|---|---|---|---|
| Water saturated with n-butanol. | 0.00 | Well defined spot | 7 |
| n-Butanol saturated with water. | 0.91 | ___do___ | 16 |
| n-Butanol-acetic acid-water (2-1-1). | 0.93 | ___do___ | 16 |
| n-Butanol-pyridine-water (1-0.7-1). | 0.92 | ___do___ | 16 |
| 3% aqueous ammonium chloride. | 0.00 | ___do___ | 4 |
| 50% aqueous acetone | 0.53 / 0.93 / 0.91 | Tailing / Well defined spot / Well defined spot | 6 |
| Tert. butanol-acetic acid-water (74-3-25). |  |  | 28 |
| n-Butanol-methanol-water (4-1-2). | 0.98 | ___do___ | 8 |
| Benzene-methanol (4-1) | 0.98 | ___do___ | 5 |

The chromatographic data for phytostreptin is consistent with the unusual solubility of this polypeptide compound in such fat solvents as acetone, methylisobutylketone, and chloroform.

Phytostreptin forms alkali metal salts such as the sodium salt with alkali metal bases, and other simple and complex salts of phytostreptin can readily be prepared as illustrated by the following examples:

Copper salt: An aqueous solution of phytostreptin (one gram in 20 ml. water) was treated with 5 ml. of 10% aqueous $CuCl_2$. The yellow precipitated solid was recovered by centrifugation, washed with 10% aqueous $CuCl_2$ and dried in vacuo (weight 0.85 gm.).

Zinc salt: An aqueous solution of phytostreptin (one gram in 20 ml. water) was treated with 5 ml. of 10% aqueous $ZnCl_2$. The tan precipitated solid was recovered by centrifugation, washed with 10% aqueous $ZnCl_2$ and dried in vacuo (weight 0.98 gm.).

Manganese salt: An aqueous solution of phytostreptin (one gram in 30 ml. water) was treated with 5 ml. of 10% aqueous $MnSO_4$. The dark tan precipitate was recovered by centrifugation, washed with 10% aqueous $MnSO_4$ and dried in vacuo (weight 1.05 gm.).

Molybdate complex: An aqueous solution of phytostreptin (one gram in 40 ml. water) was treated with 5 ml. of 20% filtered aqueous ammonium molybdate. The tan precipitated solid was recovered by centrifugation, washed with 1% filtered aqueous ammonium molybdate and dried in vacuo (weight 1.08 gm.).

Picrate complex: An aqueous solution of phytostreptin (one gram in 30 ml. water) was treated with 10 ml. of a filtered saturated aqueous solution of picric acid. The yellow precipitated solid was recovered by centrifugation, washed with filtered saturated solution of picric acid and dried in vacuo (weight 1.15 gm.).

Helianthate complex: An aqueous solution of phytostreptin (one gram in 50 ml. water) was treated with 25 ml. of a filtered saturated aqueous solution of methyl orange. The orange yellow precipitated solid was recovered by centrifugation, washed with water and dried in vacuo (weight 0.67 gm.).

Reineckate complex: An aqueous solution of phytostreptin (one gram in 50 ml. water) was treated with 5 ml. of 5% aqueous solution of Reinecke salt. The lilac colored precipitated solid was recovered by centrifugation, washed with water and dried in vacuo (weight 1.0 gm.).

The solubilities of the salts and complexes are tabulated below:

|  | $H_2O$ | 1 N NaOH | 1 N HCl | Methanol | Acetone | Chloroform |
|---|---|---|---|---|---|---|
| Zinc salt | SS | S | SS | S | S | SS |
| Copper salt | S | S | S | S | S | S |
| Manganese salt | S | S | SS | S | S | SS |
| Molybdate complex | SS | SS | SS | S | S | S |
| Picrate complex | SS | SS | SS | S | S | S |
| Helianthate complex | SS | S | SS | S | S | S |
| Reineckate complex | SS | S | SS | S | S | S |

NOTE.—S=Soluble; SS=Slightly soluble; Test: ca. 5–10 mg. solid per 5 ml. soln.

The above salts and complex compounds of phytostreptin were equally as active per unit weight as phytostreptin by in vitro paper disc-plate assay (active down to 2μg./ml.; test organism *Glomerella cingulata*). The methyl orange, Reinecke salt, picric acid and manganese sulfate reagents used for the preparation of the above derivatives had no activity against the test organism; ammonium molybdate was active down to 100 mg./ml., cupric chloride was active down to 12 mg./ml. and zinc chloride was active down to 6 mg./ml. The above salts and complexes of phytostreptin were also active in vivo as indicated by the data in Table IV, in which they are compared with phytostreptin. The test solutions were formulated in like manner to the procedure for phytostreptin.

TABLE IV.—GREENHOUSE DISEASE CONTROL STUDIES

| Preparation | $ED_{95}$ (p.p.m.) | | |
|---|---|---|---|
|  | Tomato early blight | Tomato late blight | Bean rust |
| Phytostreptin | 110, <20 | 54, 76 | 8.5, 6.2 |
| Phytostreptin, copper salt | <20, 36 | 58, .52 | 18, 6 |
| Phytostreptin, zinc salt | 60, <20 | 199, 115 | 18, 6.4 |
| Phytostreptin | 68, 60 | 160, 120 | 16, 4.2 |
| Phytostreptin, manganese salt | 60, 100 | 122, 120 | 19, 2.4 |
| Phytostreptin, molybdate complex | 58, <20 | >200, 58 | 16.9, 4.7 |
| Phytostreptin, Helianthate complex | 30, 60 | 120, 110 | 17, 4.6 |
| Phytostreptin, Reineckate complex | 78, 72 | >200, 96 | 19, 2.6 |
| Phytostreptin, picrate complex | 39, 70 | 110, 130 | 16, 12.8 |

The above physical, chemical and biological data clearly distinguishes phytostreptin from the other antifungal antibacterial antibiotics previously reported in the literature. The data for phytostreptin closely resemble those described in our copending applications for Phytoactin. However, the two can be easily differentiated as indicated by the data in Table V.

TABLE V.—DIFFERENTIATION OF PHYTOSTREPTIN AND PHYTOACTIN

|  | Phytostreptin | Phytoactin |
|---|---|---|
| Water solubility | Completely soluble. | Partly soluble. |
| Elemental analysis | 53.04 C | 56.86 C. |
|  | 8.08 H | 8.25 H. |
|  | 13.41 N | 12.46 N. |
| Molecular weight (±10%) | 28,600 | 46,000. |
| Percent amide N | 1.5% | 0.9%. |
| Infrared spectrum: |  |  |
| 7.2–7.35 microns (1390–1360). | Shoulder | Weak band. |
| 8.77–9.43 microns (1140–1060). | Broad band | Much less absorption with a very weak band at 9.25–9.43 microns (1080–1060). |
| Electrometric titration | Apparent free amino group. | No free amino group. |
| Heat stability (30 min. at 65°C.): |  |  |
| pH 3 | stable | stable. |
| pH 7 | ___do___ | Do. |
| pH 10 | ___do___ | Unstable. |

Phytostreptin is produced according to the invention by fermenting a nutrient medium with a phytostreptin-producing organism of the genus *Streptomyces*, and in particular, the species *S. hygroscopicus*, as exemplified by *S. hygroscopicus* NRRL 2751. It will be understood that it is necessary to select a Phytostreptin-producing (polyaminohygrostreptin-producing) strain of the organism, as the ability to produce the antibiotic may vary with the strain. As is well known, such variation between strains of a microorganism is frequently encountered in the microbiological production of various substances.

The antifungal may be routinely determined by the agar plate assay method using *Glomerella cingulata* or *Candida albicans* as the test organisms.

In this invention, a nutrient medium is fermented with a phytostreptin-producing culture until substantial antifungal activity is produced. Preferably, an aqueous nutrient medium is fermented under submerged, aerobic and agitated conditions.

Nutrient media which are suitable for the production of the antifungal include a suitable source of assimilable carbon, preferably a carbohydrate source such as glucose, a source of assimilable nitrogen such as soya flour, corn steep liquor, yeast and the like, and mineral salts, which may be present with the other ingredients, such as corn steep liquor. Inoculum of the organism is prepared by growing it on agar slant media such as oatmeal or peptone-yeast extract. These agar slant cultures can then be used to prepare larger amounts of inoculum by seeding shake flasks containing such media as soya flour and corn step liquor. These flasks are shaken under conditions suitable for the growth of the organism. The shake flask cultures can then be used for the preparation of larger amounts of inoculum or, alternatively, they may be used to seed the fermentors directly. Aseptic conditions must be maintained during the preparation of the inoculum and during the subsequent fermentation.

In the fermentation, the desired medium is prepared and the pH of the medium adjusted to about 6.3–7.5, preferably 6.7–7.2. Calcium carbonate is included in the preferred medium. The medium so prepared is sterilized by heating at an elevated temperature under pressure, i.e., at about 120° C. The medium is then cooled to a temperature of approximately 24°–36° C., preferably 27°–34° C. The sterile medium is then inoculated under aseptic conditions with the inoculum prepared as described above.

The fermentation then proceeds at a temperature in the foregoing ranges with agitation and aeration using sterile air. The fermentation period may vary with different media and different operating conditions. Air is ordinarily supplied at the rate of about 0.25–1.5 volumes of free air per volume of medium per minute. The fermentation is continued for a period of time sufficient to achieve optimal and preferably maximal production of phytostreptin. A fermentation period of 48–96 hours is ordinarily sufficient.

Phytostreptin may be recovered by a number of methods or, alternatively, the whole culture or whole broth may be used as such or may be concentrated or dried by suitable means. It is ordinarily preferred to recover phytostreptin by precipitation or by solvent extraction of the whole culture or whole broth. In the precipitation recovery method, the whole culture is usually filtered or centrifuged at a preferred pH range of 7–8, and the filtrate is acidified to a preferred pH range of 3–5 to precipitate the phytostreptin. The preferred acid for this precipitation step is hydrochloric acid, although other acids may also be used. Since the culture mycelium contains appreciable quantities of phytostreptin, the whole culture (without filtration) may, alternatively, be adjusted to pH 3–5 for the precipitation step.

The activity may be recovered from the precipitate or sediment by extraction with a suitable organic liquid in which it is soluble, such as methanol, ethanol, isopropanol, butanol, acetone or methylisobutyl ketone. The solvent solution may then be evaporated in vacuo, and the resulting residue further extracted with organic solvents. In the preferred method of recovery, the latter residue after evaporation is extracted exhaustively with methylisobutyl ketone, and the solvent solution is concentrated to small volume in vacuo. The phytostreptin may then be precipitated by the addition of 5 volumes of diethyl ether. The phytostreptin remaining in the methylisobutyl ketone—ether mother liquor may be recovered by concentrating the mother liquor to small volume in vacuo and adding 5 volumes of petroleum ether (30°–60° C.) to precipitate the activity. Alternatively, a solvent extract of the whole culture, whole broth or active precipitated sediment may be used as such or after concentration in vacuo without further purification.

The following example is furnished to assist in providing a complete understanding of the invention. It is to be understood that the invention is not limited thereto nor to the specific ingredients, proportions and procedures set forth therein, which are given only for purposes of illustration.

*Example*

A nutrient medium was prepared from the following materials:

| | | |
|---|---|---|
| Soya flour | grams | 30 |
| Corn steep liquor | do | 5 |
| Dextrose | do | 10 |
| Water | ml | to 1000 |

After adjusting the mixture to pH 6.7–7.2 with sodium hydroxide, 2 grams of calcium carbonate were added. A slant culture of the phytostreptin-producing organism NRRL 2751 was used to inoculate a number of 500 ml. Erlenmeyer flasks, each containing 120 ml. of the above medium previously sterilized with steam for 30–45 minutes at 121° C. These flasks were shaken at 28° C. for 48–72 hours until good growth was obtained.

A nutrient medium was prepared from the following materials:

| | | |
|---|---|---|
| Soya flour | grams | 200 |
| Corn steep liquor | do | 32 |
| Dextrose | do | 240 |
| Water | ml | to 8000 |

After adjusting the mixture to pH 6.7–7.2 with sodium hydroxide, 16 grams calcium carbonate were added. The mixture was sterilized with steam, cooled to 28° C. and inoculated with 120 ml. of the inoculum prepared above. The organism was then cultivated at 28° C. under submerged conditions of aeration and agitation for a period of 20–24 hours.

A nutrient medium was prepared from the following materials:

| | | |
|---|---|---|
| Soya flour | lbs | 23 |
| Corn steep liquor | lbs | 3.7 |
| Dextrose | lbs | 27.5 |
| Water | gallons | to 110 |

After adjusting the mixture to pH 6.7–7.2 with sodium hydroxide, 4.6 pounds of calcium carbonate were added. The mixture was sterilized with steam, cooled to 28° C. and inoculated with 8000 ml. of the inoculum prepared above. The organism was then cultivated at 28° C. under submerged conditions of aeration and agitation for a period of 90 hours.

The fermentation whole culture (140 gallons; combined whole culture from two fermentors) was adjusted to pH 4 with hydrochloric acid and filtered using diatomaceous earth filter aid (Celite 503). The wet filter cake was then extracted with methanol (637 lbs.), and the alcohol extract, containing a considerable quantity of water, concentrated in vacuo to approximately 10 liters. The concentrate containing mostly water as the solvent was readjusted to pH 4 and the precipitated solid recovered by decantation. The recovered active sediment was then slurried with methanol (approximately 16 liters), filtered and the alcohol extract concentrated to approximately 1400 mls. During the concentration, about 10 liters of methanol was added to eliminate water present. After extracting the alcoholic concentrate with petroleum ether (30°–60° C., 2950 mls.), the alcoholic solution was then evaporated to dryness on 550 grams of Celite 503 filter aid in vacuo. The filter aid-solid was preliminarily extracted with diethyl ether (5425 ml.), and then exhaustively extracted with methylisobutyl ketone (25 liters). The methylisobutyl ketone solution was concentrated in vacuo to small volume (1200 ml.), and the phytostreptin precipitated by the addition of five volumes of diethyl ether (6000 ml.). The solid thus obtained was washed with further quantities of diethyl ether (2000 ml.) and petroleum ether (30°–60° C., 1500 ml.) and dried in vacuo (weight 120 grams).

A portion of the phytostreptin so obtained was further purified by ammonium sulfate precipitation. The above preparation (5 grams) was dissolved in water and ammonium sulfate (10 grams) added. The resulting precipitate was recovered by centrifugation, washed with 20% aqueous ammonium sulfate (90 ml.) and dried in vacuo. The dried solid was then extracted with anhydrous chloroform and the solvent extract filtered. The chloroform solution was concentrated in vacuo to 50 ml. and the phytostreptin precipitated by the addition of diethyl ether (400 ml.). The precipitated solid was filtered, washed with diethyl ether (approximately 100 mls.) and dried in vacuo (weight 3.56 grams).

The solid phytostreptin product thus obtained has the characteristics described above in the specification, and constituted the product tested in each instance. It is apparently in a high state of purity, as evidenced by the high activity per unit weight, both in vitro and in vivo (plants), and the test for homogeneity.

Further quantities of phytostreptin were obtained by concentrating the above methylisobutyl ketone-ether mother liquor to 800 ml. in vacuo and adding 4000 ml. petroleum ether (30°–60°). The precipitated solid was filtered, washed with petroleum ether (30°–60° C.) and dried in vacuo (10.9 grams).

The invention thus provides a new antifungal substance, which is particularly effective against plant pathogens and useful in the control of diseases caused by such organisms. The invention also provides a new process for the production and purification of phytostreptin and for the preparation of its active salts and complexes.

This application is a continuation-in-part of our copending patent application Serial No. 659,818, filed May 17, 1957.

The invention is hereby claimed as follows:

1. An antifungal substance of the group consisting of polyaminohygrostreptin and salts thereof, said polyaminohygrostreptin being an antifungal, gram-positive antibacterial, laevo rotatory polypeptide containing the amino acid groups valine, alphaalanine, proline, leucine, arginine, glycine, and serine; being soluble in water, 1 N NaOH, methanol, ethanol, n-butanol, chloroform, acetone, methylisobutyl ketone, dioxane, tetrahydrofuran, formamide, and ethylene chloride; being slightly soluble in diethyl ether and 1 N HCl; being insoluble in petroleum ether (30–60° C.), benzene, and ethyl acetate; having the elemental analysis 53.04% carbon, 8.08% hydrogen, and 13.41% nitrogen; being essentially inactive against *Escherichia coli* and *Mycobacterium tuberculosis* No. 607 and having specific activity against the remaining organisms listed in Table II and *Phytophthora infestans* and *Uromyces phaseoli*; exhibiting no significant ultraviolet absorption maxima in the region 230–410 millimicrons; having the infrared absorption spectrum in potassium bromide pellet shown in FIGURE 3; having electrometric tiration pK values, starting from the acid range, (1) in water of 2.4 and an equivalent weight of 1000 grams per mole, (2) in water of 9.6 and an equivalent weight of 3500 grams per mole, (3) in 70% solution of methanol in water of 3.4 and an equivalent weight of 3300 grams per mole, and (4) in 70% solution of methanol in water of 9.4 and an equivalent weight of 3300 grams per mole, and having a molecular weight of 28,600 as determined by the Ehrenberg modification of the Archibald method.

2. The antifungal polyaminhygrostreptin as defined in claim 1.

3. A salt of the antifungal polyaminohygrostreptin as defined in claim 1.

4. A metal salt of the antifungal polyaminohygrostreptin as defined in claim 1.

5. A complex salt of the antifungal polyaminohygrostreptin as defined in claim 1.

6. The zinc salt of the antifungal polyaminohygrostreptin as defined in claim 1.

7. The copper salt of the antifungal polyaminohygrostreptin as defined in claim 1.

8. The manganese salt of the antifungal polyaminohygrostreptin as defined in claim 1.

9. The molybdate complex salt of the antifungal polyaminophygrostreptin as defined in claim 1.

10. The picrate complex salt of the antifungal polyaminohygrostreptin as defined in claim 1.

11. The process which comprises fermenting a nutrient medium with a polyaminohygrostreptin-producing train of *Streptomyces hygroscopicus* until substantial antifungal activity is produced.

12. The process which comprises fermenting a nutrient medium with a polyaminohygrostreptin-producing strain NRRL 2751 of *Streptomyces hygroscopicus* until substantial antifungal activity is produced.

13. The process which comprises fermenting a nutrient medium with a polyaminohygrostreptin-producing strain NRRL 2751 of *Streptomyces hygroscopicus* until substantial antifungal activity is produced, and producing a concentrate of phytostreptin from the fermentation product.

14. The process which comprises fermenting under aerobic conditions an aqueous nutrient medium containing a source of assimilable nitrogen, and a source of assimilable carbon, with a polyaminohygrostreptin-producing strain NRRL 2751 of *Streptomyces hygroscopicus* until substantial antifungal activity is produced.

15. The process which comprises fermenting under aerobic conditions an aqeous nutrient medium containing an organic source of assimilable nitrogen and a carbohydrate, with a polyaminhygrostreptin-producing strain NRRL 2751 of *Streptomyces hygroscopicus* at a temperature of about 24° C. to 36° C. for about 48 to 96 hours.

16. The process which comprises fermenting under aerobic conditions an aqueous nutrient medium containing an organic source of assimilable nitrogen and a carbohydrate, with a polyaminohygrostreptin-producing strain NRRL 2751 of *Streptomyces hygroscopicus* until substantial antifungal activity is produced, adjusting the pH of the fermentation product to about 3 to 5, and separating the solid phytostreptin concentrate from the liquor.

17. The process which comprises fermenting under submerged aerobic conditions an aqueous nutrient medium containing an organic source of assimilable nitrogen and a carbohydrate, with a polyaminohygrostreptin-producing strain NRRL 2751 of *Streptomyces hygroscopicus* at a temperature of about 24° C. to 36° C. and at a pH of about 6.3 to 7.5 until substantial antifungal activity is produced, adjusting the pH of the fermentation product to about 3 to 5, separating the solid phytostreptin concentrate from the liquor, extracting the concentrate with an organic solvent for phytostreptin selected from the group consisting of lower alkyl alcohols and lower alkyl ketones, and recovering phytostreptin from the solvent extract.

References Cited in the file of this patent

Ziffer et al.: Phytopathology, p. 539, 1957.

UNITED STATES PATENT OFFICE
CERTIFICATE OF CORRECTION

Patent No. 3,032,470                                          May 1, 1962

Jack Ziffer et al.

It is hereby certified that error appears in the above numbered patent requiring correction and that the said Letters Patent should read as corrected below.

Column 3, line 26, for "7.2" read -- 7 --; line 33, for "7" read -- 7.2 --; column 6, TABLE II, column 4, line 10 thereof for "37.3-197" read -- 27.3-197 --; column 8, in the first table, column 1, line 2 thereof, for "70+" read -- 70% --; column 10, TABLE IV, column 3, line 2 thereof, for "58,.52" read -- 58, 52 --; column 11, line 25, for "step" read -- steep --; column 14, line 23, for "train" read -- strain --.

Signed and sealed this 9th day of October 1962.

(SEAL)
Attest:

ERNEST W. SWIDER                                        DAVID L. LADD
Attesting Officer                                           Commissioner of Patents